(No Model.)　　　　　　H. LACASSE.　　　　3 Sheets—Sheet 3.

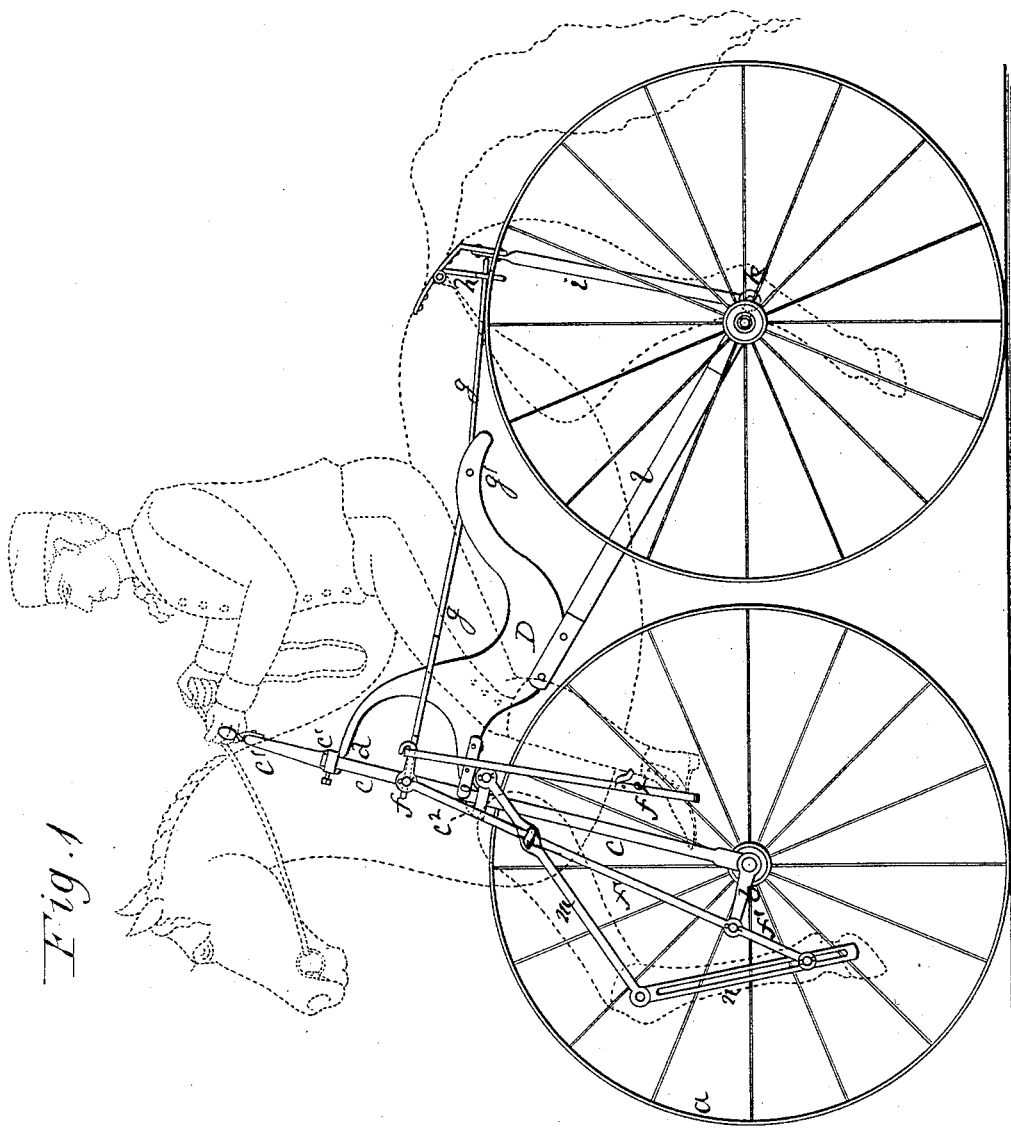

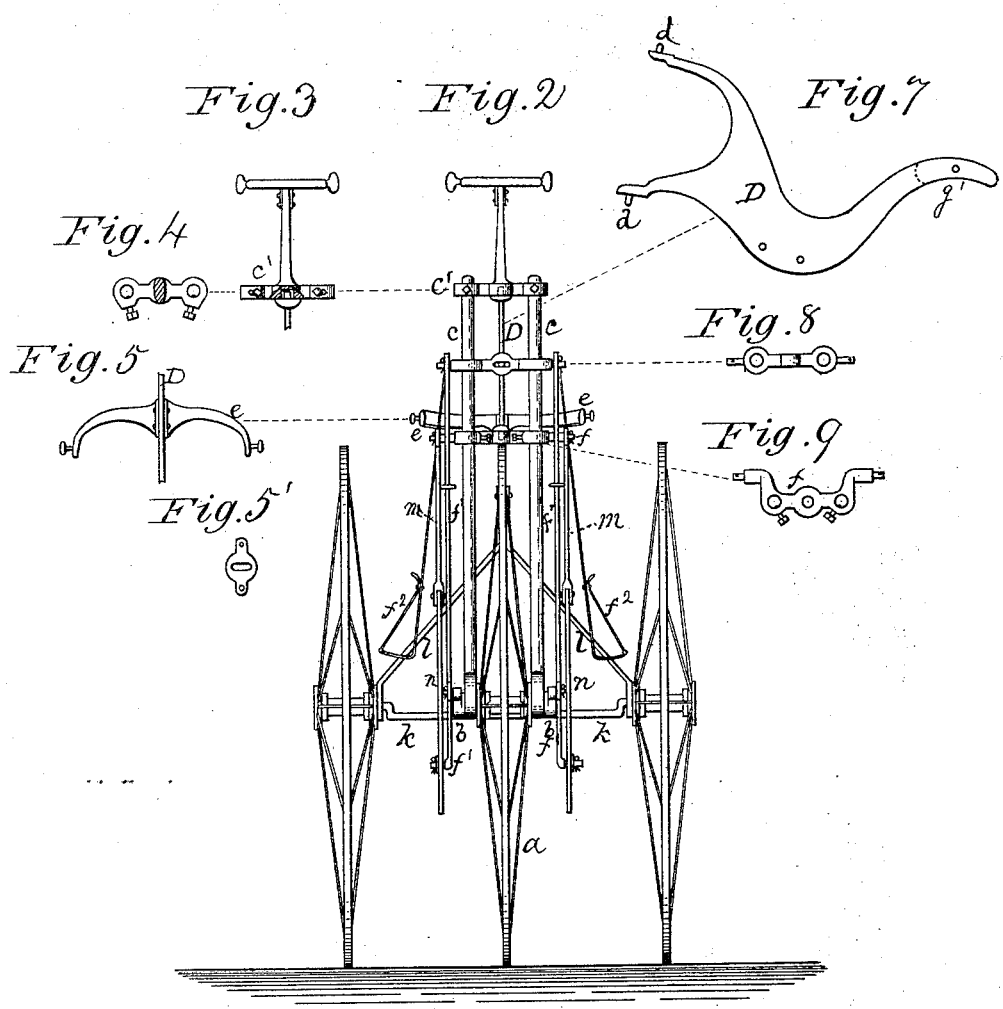

GALLOPING HORSE.

No. 327,697.　　　　　　　　　　Patented Oct. 6, 1885.

Witnesses:　　　　　　　　　　Inventor:
J. Johnson　　　　　　　　　　H. Lacasse
Thos Wait　　　　　　　　　　by J. J. Greenough
　　　　　　　　　　　　　　　Atty.

UNITED STATES PATENT OFFICE.

HENRY LACASSE, OF AUBURN, NEW YORK.

GALLOPING HORSE.

SPECIFICATION forming part of Letters Patent No. 327,697, dated October 6, 1885.

Application filed August 29, 1884. Serial No. 141,785. (No model.)

*To all whom it may concern:*

Be it known that I, HENRY LACASSE, of Auburn, in the county of Cayuga, State of New York, have invented a certain new and useful device which I denominate a "Galloping Horse," of which the following is a description.

My invention relates to a method of driving the wheels by the application of the weight of the person thrown alternately upon the feet and the seat of the rider, and also the mechanism for moving the limbs and body of an artificial animal to imitate a galloping horse or other animal. I attain these objects by the mechanism illustrated in the following drawings, in which—

Figure 10:
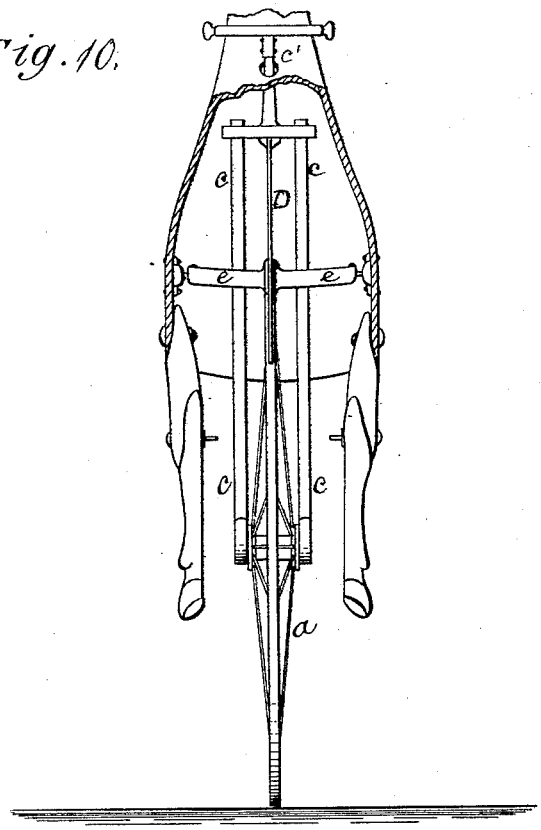
Figure 11:
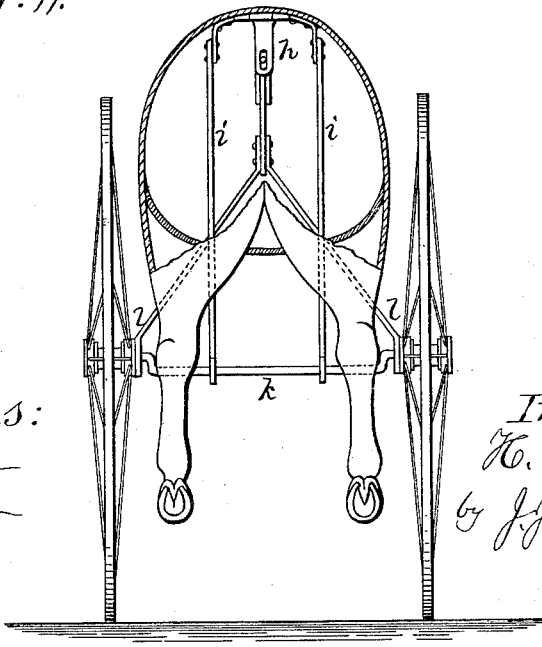

Figure 1, Sheet 1, is a side elevation of the mechanism. Fig. 2, Sheet 2, is a front elevation of the same; Figs. 3 to 9, Sheet 2, details of parts detached; Fig. 10, Sheet 3, front section of shell and mechanism; Fig. 11, Sheet 3, rear section of the same.

Like parts in the several figures are designated by the same letters in all the figures.

In Fig. 1 a horse and rider are shown by dotted lines representing them transparent to show those parts of the mechanism within the body to which the body is affixed to supports, as hereinafter described. There is one wheel, $a$, in front and two behind. The axle of the forward wheel, $a$, bears a crank, $b$, on each end, and just inside of these cranks are the axle-bearings in the lower ends of two uprights, $c$, that extend upward, as seen in Figs. 1 and 2. These are united at top by a cross-piece, $c'$, Fig. 4, from which a projection rises, protruding through the neck of the animal, with a cross-handle at top. Below cross-piece $c'$ there is a second stationary cross-piece, $c^2$. The cross-handle above serves to turn this frame and the wheel $a$, the frame being pivoted on lugs $d\,d$ of plate D. (See Fig. 7.) Plate D is bifurcated at its rear end for a fulcrum to lever $g$. It is shaped to fit its position, as seen in Fig. 7. To the lower forward limb of plate D a fulcrum-bar, $e$, is bolted, formed as shown in Fig. 5. This bar is so curved as to permit the swiveling of the wheel-frame on the lugs $d\,d$. There are projections or buttons on the ends of bar $e$ that couple with sockets, Fig. 5, that are affixed to the interior of the body of the animal by which the forward end of said body is supported. There is a cross-head, $f$, sliding up and down on the uprights $c$, carrying on each end a pitman, $f'$, that connects with crank $b$ below on the axle of wheel $a$. At the upper end of these pitmen $f'$ there is a horizontal projection backward, on which the stirrups $f^2$ are suspended to receive the feet of the rider, which, by their downward pressure, cause the wheel $a$ to make a semi-revolution. The bar $g$, above named, having its fulcrum at the rear of plate D, is connected at its forward end with cross-head $f$. Its rear end extends back to the rump of the animal, over the rear axle, $k$, that unites the rear wheels, where it is united with a projection, $h$, hinged to the body at the rump. To this same hinge the hind legs are also hinged. To this same hinge are affixed two pitmen, $i$, (see Fig. 11,) that extend down to a sunk crank in the rear axle, $k$, which is shorter than the forward ones, $b$. The arms of lever $g$ being proportioned to their difference, as the stirrups force the front crank down the crank on axle $k$ rises, lifting the rump of the animal, and when the body is pressed down the stirrup-crank $b$ rises, causing the wheels to make an entire revolution, which are made to harmonize by lever $g$. To each side of the plate D braces $l$ are affixed, forming a reach, in the rear ends of which are the boxes in which axle $k$ turns. The movement of the hind legs is made by the pitman $i$. The fore legs are jointed at the knee, the upper joints being connected with the levers $m$, that are pivoted at their upper ends to cross-piece $c^2$, (see Fig. 9,) one on each side. These levers $m$ are coupled below their fulcrum with pitman $f$, which has an extension below the pin of crank $b$, where it bears a wrist-pin, that enters a slot in bar $n$, to which the lower joint of the leg is attached, the bar $n$ being jointed to the end of lever $m$ at the knee. By this construction the fore legs are bent and thrown forward, as in the act of galloping, at every revolution of crank $b$.

The several parts of the shell forming the head, body, and limbs of a horse or other animal are stamped from thin sheet metal, or molded of any other suitable material, and covered with skin or otherwise.

The galloping horse thus described is put into action as follows: The person mounting him puts his feet in the stirrups, and by bearing his weight upon them drives the crank $b$ downward, and causes the wheel $a$ to turn and the horse to advance, at the same time throwing out his fore legs and making a step, while at the same time the rear wheels turning raise the rump the distance the crank $k$ sweeps. Then by bringing the weight down upon the horse's back completes the revolution of the cranks front and rear. By a repetition of these movements the animal is made to run along, moving his limbs in a natural way.

Having thus described my invention, I claim—

1. The combination of the stirrups with the forward wheel by means of the bell-crank pitman $i$, connecting them with the crank $b$, substantially as and for the purposes specified.

2. The combination of the pitman $f'$, lever $m$, and bar $n$, for moving the fore legs properly, as specified.

3. The combination of the frame $c$, wheel $a$, sliding head, and pitman $f'$, constructed and arranged as specified.

4. The combination of the pitman $f'$, lever $m$, and bar $n$ with the swiveling-frame supporting the body on the wheel $a$, as specified.

5. The combination of the lever $g$ with the front and rear crank movements, as specified.

6. In combination with the jointed pitman $i$, hinged at the rump of the animal, as described, the hind legs, constructed and arranged as specified.

7. The combination of the forward and rear axles of the wheels, whereby all the wheels are made propellers of the automaton, substantially as described, so as to cause the wheels to revolve by alternately bearing upon the stirrups and back of the animal, as specified.

HENRY LACASSE.

Witnesses:
P. McLaughlin,
William E. Peters.